Figure 1:
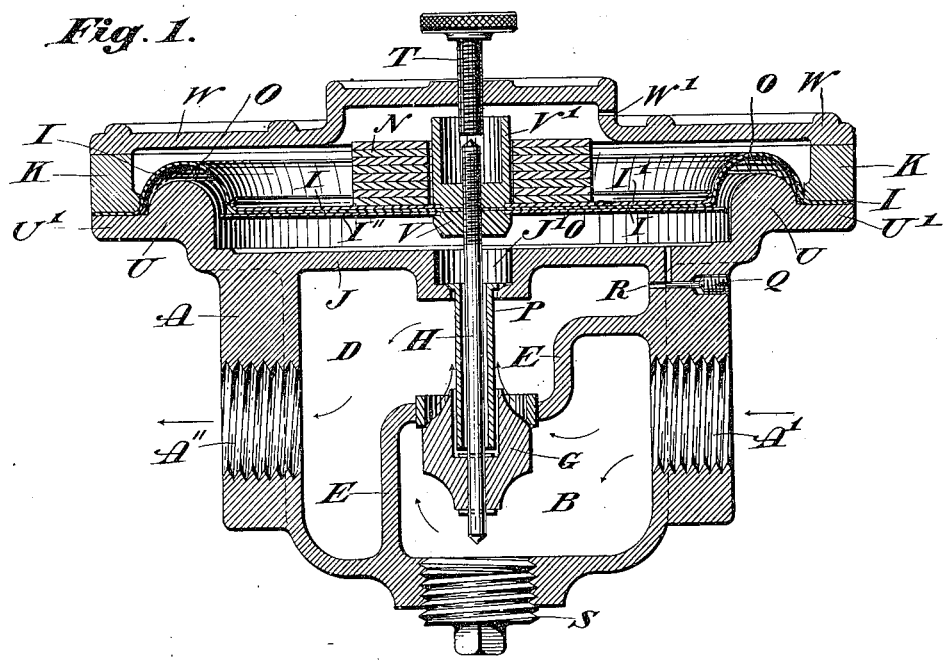

No. 646,064. Patented Mar. 27, 1900.
R. N. BAYLIS.
FLUID PRESSURE REGULATOR.
(Application filed Sept. 26, 1899.)
(No Model.) 3 Sheets—Sheet 1.

WITNESSES:
INVENTOR:
Robert N. Baylis.
BY
ATTORNEY

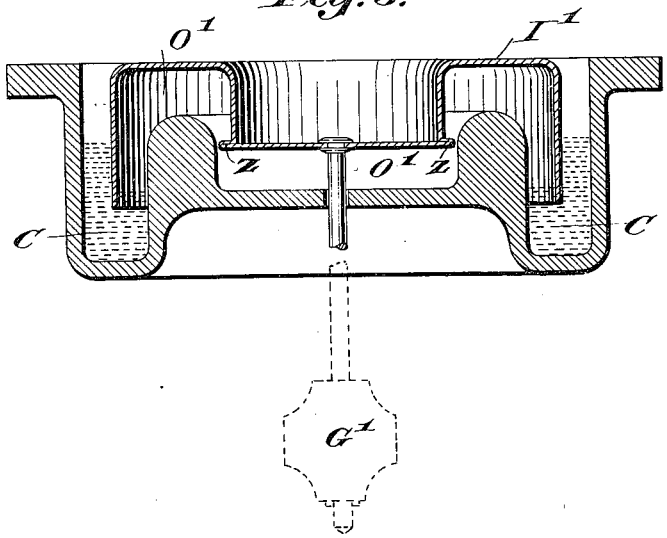
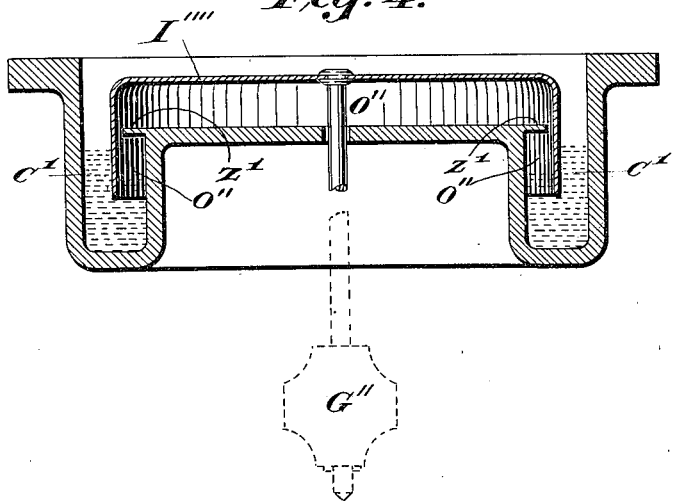

No. 646,064. Patented Mar. 27, 1900.
R. N. BAYLIS.
FLUID PRESSURE REGULATOR.
(Application filed Sept. 26, 1899.)

(No Model.) 3 Sheets—Sheet 3.

WITNESSES:
Geo. T. Hackley
J. B. Bassett

INVENTOR
Robert N. Baylis.
BY
ATTORNEY

UNITED STATES PATENT OFFICE.

ROBERT N. BAYLIS, OF ENGLEWOOD, NEW JERSEY.

FLUID-PRESSURE REGULATOR.

SPECIFICATION forming part of Letters Patent No. 646,064, dated March 27, 1900.

Application filed September 26, 1899. Serial No. 731,735. (No model.)

*To all whom it may concern:*

Be it known that I, ROBERT NELSON BAYLIS, a citizen of the United States, residing at Englewood, Bergen county, New Jersey, have invented certain new and useful Improvements in Fluid-Pressure Regulators, of which the following is a full, clear, and exact description.

My invention relates to a device for regulating the pressure of fluids, whereby a uniform pressure may be maintained at the service-outlet or at translating devices on the system.

Among the objects of my invention is to provide in a pressure-regulator automatic means for regulating the flow of fluid, so that while entering at one side of the regulator at a variable pressure it passes through said regulator into the service-pipe and thence to the transmitting devices—such as gas-burners, compressed-air motors, water-motors, or the like—at which devices a reduced uniform pressure may be maintained, the said end being accomplished by a mechanism which is of automatic action and which is simple, durable, and effective in operation.

This invention is particularly useful to regulate the pressure of gas as used for illuminating, heating, and other purposes, since it is necessary to the economical use of this commodity and in order to secure the most effective results that the pressure at the burners be maintained constant. There is a certain pressure at which the burner will operate most effectively as a light-producer or heater, and in the case of an increase of the pressure beyond this point the efficiency will fall off. Again, if the pressure decreases the candle-power of the light will drop off. If a regulator be employed that gives a positive and fixed pressure upon the service-pipe, there will still be a falling off of pressure at the burners when gas is passing through the pipes in proportion to the rate of flow, due to the drop in pressure between the regulator and burners owing to friction in the pipes. Moreover, a common defect of pressure-regulators heretofore used is that instead of actually maintaining a uniform pressure at the service-outlet the pressure drops off to some extent, which drop is still further increased by the time the burners are reached by the above-mentioned drop of pressure in the pipes due to friction.

The purpose of my invention is to provide a device that will when desired cause the pressure at the service-outlet to increase as the rate of flow increases, and thus maintain a constant pressure at the translating devices themselves. It has been demonstrated both in theory and practice that in the use of fluids a proper regulation of pressure will effect large economies.

Another object of this invention is to prevent the fluttering or chattering of the regulating-valve when a small quantity of fluid is passing through the same. Practical experience has demonstrated that in the pressure-regulators thus far known to the art there is always a tendency at such time for the valve to open and close rapidly, oscillating or vibrating on its seat, thus producing a vibratory unsteadiness of the service pressure. This undesirable feature is by the present invention overcome.

Other objects are attained by certain features of construction worked out to meet practical requirements, some of which will be duly pointed out.

Figure 2:
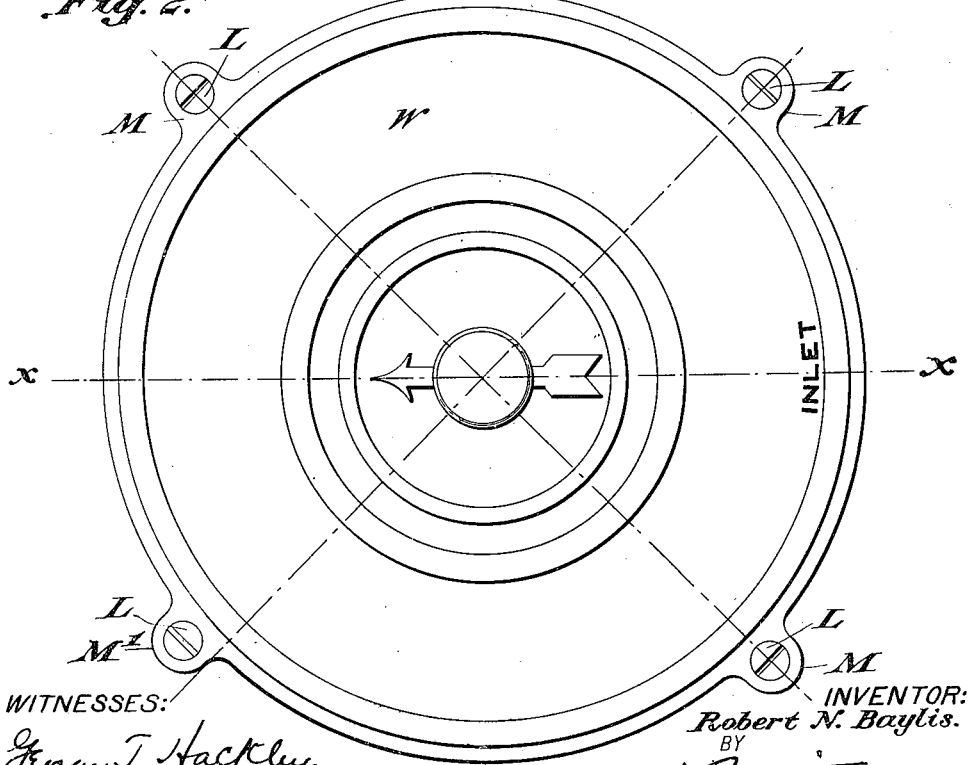
Figure 5:
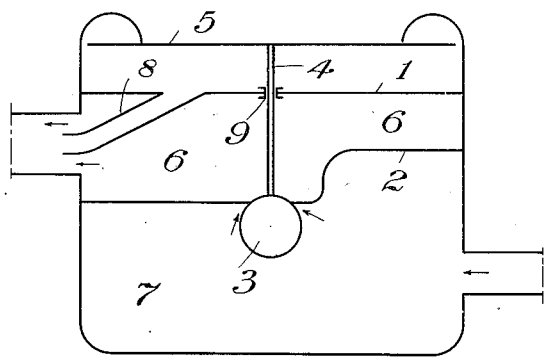

In the drawings, Figure 1 is a sectional view on the line X X, Fig. 2. Fig. 2 is a plan view of a construction embodying my invention. Figs. 3 and 4 are sectional views of modified details of portions of the apparatus. Fig. 5 is a diagrammatic illustration of a modification.

A is the body portion of the regulator, to which a supply-pipe may be attached, as at A', and a service-pipe, as at A''. These pipes connect, respectively, with what will be termed herein a "supply-chamber" B and a "service-chamber" D, the same being separated by a partition E, formed so as to make a suitable seat for the valve G. Said valve is carried by the stem H, pendent from a diaphragm I or its equivalent, located above a partition J. This diaphragm may be made of any suitable material, and in the form of regulator shown may be clamped around its outer edge, as by the ring K. In this form of regulator I prefer to partially reinforce the diaphragm, as by clamping it between two plates I' I'', the lower of which may fit without touching the surrounding portion of the body A, forming, in effect, a piston dividing the space below the diaphragm and adapted to move therein. For convenience this space O may be termed the "pressure-chamber." The reinforcing of a flexible diaphragm has the important function of keeping the effective area of the diaphragm practically constant. By means of the piston previously referred to a damper or dash-pot is formed, which prevents the fluttering or oscillating of the valve. Surrounding the chamber O may be formed an annular raised portion U to conform the diaphragm when it is being clamped in position and to further restrict the space under the diaphragm to only that necessary for its movement. The annular formation U is a valuable practical feature, as where a flexible diaphragm is used it enables the same to be put in position at any time with a predetermined conformation and degree of slackness and without any special auxiliary forming device. The upper plate I' may be curled at its rim to form a smooth edge in order to avoid abrading or cutting the diaphragm.

V and V' are clamping-nuts, shouldered, as shown, to a depth corresponding to or slightly greater than the thickness of plates I' I", to the end that a tight joint may be obtained where the valve-stem passes through the diaphragm. The upper nut V' may form a post or stud for the purpose of centering a set of weights N, by means of which the service-pressure may be adjusted as desired. A depression J' may be formed in the partition J to receive the nut V in its lowest position, and thereby afford a means of centering the valve-stem when the diaphragm is being formed and clamped in position.

A cover W may surmount the clamping-ring K, forming an air-space above the diaphragm, communicating with the external air through a small aperture, such as the hole W', to resist the ready flow of air in either direction. This restricted air-space above the diaphragm coöperates with the confined space below (pressure-chamber O) to check and prevent any fluttering of the valve. Furthermore, in case of any leakage through the diaphragm of such a fluid as illuminating-gas, whose unrestricted egress to the atmosphere might be a source of danger, the stricture afforded by the small opening W' acts as a safeguard, restricting such leakage until discovered and repaired.

Another feature of my device is the means of clamping the diaphragm in place without perforations and also for indicating the proper connections for the supply and service pipes. I provide extending lugs M, Fig. 2, upon the flange U', the ring K, and the cover W, spaced so as to register properly and afford means of holding the parts together, as by the screws L. The object of the lugs M is to avoid punching holes in the clamped edge of the diaphragm. One set of lugs, as M', is located out of symmetry with the others, so that the cover W can be put on only in one predetermined position, which permits the placing thereon of an arrow or other indicating device, as the word "Inlet," to act as a guide in properly connecting the supply and service pipes, it being simpler and more convenient to place such indicating means on the cover rather than in the body portion.

The screw T affords a ready and simple means for holding the valve open when it is desired, as is frequently the case, to throw the regulator out of action and submit the service-pipes to the full pressure of the supply—as, for instance, when one wishes to make a comparative test of a system with and without a regulator. The screw T has the further function of holding the moving parts in a fixed position for shipment or other handling of the device, thereby avoiding injury. This may be accomplished by driving screw T down, thereby holding immovable the valve-stem H and parts connected thereto.

The service-chamber D communicates with the pressure-chamber O under the diaphragm through the pipe P, whose internal diameter may be made sufficiently larger than the stem H, which passes through it, to avoid contact between the two, such contact being highly objectionable, since any unnecessary resistance at this point will tend to impair the accuracy of the operation of the valve. Tube P may extend down into a recess or cavity in valve G of a size sufficient to provide enough clearance-space around the tube to avoid liability of actual contact between the two. A restricted communication between chamber O and chamber D may be thus provided. The upper portion of the valve is suitably shaped to cause the fluid as it passes through the valve-opening F from supply-chamber B to service-chamber D to form an annular jet moving in proximity to and approximately parallel with the tube P at the point where said jet of fluid passes the annular opening between the tube and the upper extremity of valve G. The tube P may be hung from partition J by having a flange formed at its upper end, as shown, said flange resting in a socket, which is preferably of spherical contour, so that a tight joint will always be maintained whether the tube P hangs centrally with respect to the valve-opening or is somewhat displaced in case the apparatus is not set quite level. In large regulators, where accurate leveling may be relied on, tube P may be fixed rigidly in partition J.

Q is a suitable valve for opening and closing an auxiliary communication, as by the port R, between service-chamber D and pressure-chamber O. The plug S closes the opening beneath the valve, as shown. If desired, the supply-pipe may be connected at this opening instead of at A', in which case plug S would be transferred to opening A'.

In practical operation the extent of the valve-opening is conditioned upon establishment of equilibrium between the forces acting, respectively, downwardly and upwardly upon the moving system. The former forces, or those tending to open the valve, are those due to the weights N, (or springs, if used,) the weight of the valve and other moving parts, and the pressure of the atmosphere on the upper side of the diaphragm. The upwardly-acting forces, or those tending to close the valve, are those of the supply-pressure on the lower side of the valve G and the pressure of the fluid in the chamber O upon the under side of the diaphragm. The supply-pressure on the lower side of the valve may be neglected, since the diaphragm area is made large relative to the value area for that purpose. The same end may be attained, in case the supply-pressure is very much greater than the desired service pressure, by using a suitable form of balanced valve.

When no fluid is being drawn from the service-pipe, (all translating devices being shut off,) the pressure in the service-chamber D and the communicating chamber O will be sufficient to hold the valve G tightly closed against its seat, the position shown in Fig. 1. When fluid is drawn from the service-pipe, causing the pressure in chambers D and O to fall slightly below that required to maintain the equilibrium, the diaphragm at once drops, opening the valve and allowing sufficient fluid to enter from the supply-chamber to reëstablish equilibrium. A constant pressure on the under side of the diaphragm must always be maintained, and hence the valve opens wider in proportion as more fluid is drawn from the service-pipe.

Heretofore in pressure-regulators of this kind the jet of fluid rushing in through the valve-opening has been allowed to impinge more or less directly upon the lower side of the diaphragm, (either through the absence of a partition, such as J, or by way of the opening in such partition for the passage of the valve-stem,) thus adding a component to the force tending to close the valve and thereby causing a reduction of the service pressure proportional in a measure to the quantity of fluid passing through the valve-opening. This very undesirable falling off in the service pressure is in my construction not only obviated, but the action of the fluid is reversed, so as to build up the service pressure as the flow increases. This is accomplished by properly directing the fluid jet past the opening between the chamber O and the chamber D, so as to cause a suction in accordance with known dynamic laws, resulting in a diminution of pressure in chamber O relative to that in chamber D, which diminution must be counterbalanced by a corresponding building up of the service pressure, such increase being greater in proportion as the rate of flow of the fluid increases.

By means of the construction shown in the drawings I am enabled to produce the above effect and incidentally dispense with the necessity of a substantially-tight sliding joint where valve-stem H passes through partition J, thereby relieving the parts of unnecessary friction. The specific construction is, however, not essential, for it is obvious that the same end might be attained in substantially the same manner as above described by means of an apparatus varied in construction from that specifically shown in the drawings—for example, by connecting a suction-pipe to partition J at some point other than that shown for tube P, in which event the tube P might or might not be dispensed with.

The amount of building up of service pressure may be regulated as desired by means of the variable auxiliary communication through the port R.

While I have shown and described a pressure-regulator employing a flexible diaphragm, which is the type of regulator preferred for certain uses, I do not want to be understood as limiting my invention to that particular type, since for some purposes I prefer to use instead of a diaphragm (in the technical sense) an equivalent therefor—for example, a float or dome in a liquid seal or other suitable device for permitting the establishment of equilibrium between the forces tending to open the valve and those tending to close it. Therefore in the use of the word "diaphragm" I intend to include all mechanical equivalents.

Figs. 3 and 4 show modifications of what is regarded herein as the equivalent of the reinforced diaphragm, in which the floats respectively shown therein are reinforced or stiffened by the use of a material which is in itself of an unyielding nature—for example, metal, vulcanite, or other suitable material. These views, Figs. 3 and 4, also show the mechanical equivalent of the method of dividing the pressure-chamber into a plurality of compartments having a restricted communication one with the other for the purpose of preventing the fluttering of the valve hereinbefore referred to. In Fig. 3, I' is the float, O' is the pressure-chamber, and G' the valve of which the float is the controller. No attempt is made in this figure to show the means for building up the pressure on the service side of the valve, as the rate of flow of fluid increases, as hereinbefore referred to. C is a liquid seal. In Fig. 4, I'''' is a float. O'' is a pressure-chamber. G'' is a valve of which the float is the controller. C' is a liquid seal. In this figure no attempt is made to show the means by which the pressure on the service side of the valve is built up as the rate of flow of the fluid increases, as hereinbefore described. In Fig. 3, Z is the means which produces the piston effect to prevent the fluttering of the valve G'. In Fig. 4, Z' is the means which produces the piston effect to prevent the fluttering of the valve G''.

The operation of the devices shown in Figs. 3 and 4, respectively, is obvious from the description of what is shown in Fig. 1 and need not necessarily be repeated.

I have previously referred to a modification in which the suction-pipe is connected to the partition J at some point other than that shown for the tube P. In Fig. 5 I have shown a diagrammatic illustration of what may be regarded as such a modification. In this figure, 1 is a partition that divides the pressure-chamber from the service-chamber. 2 is a partition which divides the supply-chamber from the service-chamber. 3 is a valve. 4 is a valve-stem carried by the diaphragm 5. 6 is the service-chamber. 7 is the supply-chamber. 8 is a tube which is connected with the pressure-chamber and directed into the service-chamber in such manner that the gas that rushes by it tends to create a suction to draw from the pressure-chamber a portion of the gas therein contained, thereby to cut down the pressure in the service-chamber, and consequently build up or relatively increase the pressure in the service-chamber. 9 represents a bearing through which the valve-stem 4 passes. As made by me, this bearing 9 was capable of slight lateral displacement, so that the valve-stem might have slight lateral play. It should be observed that it is preferable to arrange the building-up means in such manner that the suction end of the same is located at a point where the flow of the fluid is comparatively rapid.

What is claimed is—

1. In a device of the character described, a supply-inlet, a service-outlet, a valve between said inlet and outlet, a controller for said valve, a stem between said valve and controller, and means to center and support said stem laterally when the valve is opened to its fullest extent, said means leaving said valve-stem laterally unsupported at other positions.

2. In a device of the character described, a diaphragm, a pressure-chamber on one side of said diaphragm, means controlled by said diaphragm partially dividing said chamber, a fluid-passage, a valve therefor controlled by said diaphragm, a laterally-yielding support for said valve, and a communication between said chamber and the space on the service side of said valve.

3. In a device of the character described, a supply-inlet, a service-outlet, a valve between said inlet and said outlet, a diaphragm controlling said valve, a laterally-yielding support for said valve, a reinforce for said diaphragm, a casing around said reinforced portion of said diaphragm forming a pressure-chamber on one side of said diaphragm, said chamber being partially divided by said reinforce, and in communication with the chamber on the service side of the valve.

4. In a device of the character described, a diaphragm, a pressure-chamber on one side of said diaphragm, a reinforce for said diaphragm, said reinforce partially dividing said pressure-chamber, a fluid-passage, a valve therefor controlled by said diaphragm, a laterally-yielding support for said valve and a communication between said pressure-chamber and the chamber on the service side of said valve.

5. In a device of the character described, a diaphragm, a pressure-chamber on one side of said diaphragm, means controlled by the diaphragm and partially dividing said pressure-chamber, a fluid-passage, a valve therefor controlled by said diaphragm, a laterally-yielding support for said valve and a restricted communication between said pressure-chamber and the chamber on the service side of said valve.

6. In a device of the character described, a supply-inlet, a service-outlet, a valve between said inlet and said outlet and means to utilize the fluid passing said valve to build up the service pressure.

7. In a device of the character described, a supply-inlet, a service-outlet, a valve between said inlet and said outlet, a controller therefor and means to utilize the fluid passing said valve to build up the service pressure.

8. In a device of the character described, a supply-inlet, a service-outlet, a valve between said inlet and said outlet, a controller therefor, a pressure-chamber on one side thereof, and means to utilize the fluid passing through said valve to lower the pressure in the pressure-chamber and thereby build up the service pressure.

9. In a device of the character described, a supply-inlet, a service-outlet, a valve, means to control said valve, a chamber on one side of said means in communication with the space on the service side of said valve, said communication being in the form of a restricted opening through which fluid may be drawn from the chamber by the action of the fluid passing through the regulator.

10. In a device of the character described, a supply-inlet, a service-outlet, a valve between said inlet and said outlet, a controller therefor, a pressure-chamber on one side of said controller, a means of communication between said pressure-chamber and the space on the service side of said valve, said means comprising a tube, the free end of which is loosely enveloped within the valve, or an extension therefrom.

11. In a device of the character described, a supply-inlet, a service-outlet, a valve between said inlet and said outlet, a valve-controller, a pressure-chamber at one side thereof, a valve-stem and means of communication between said pressure-chamber and the space on the service side of said valve, comprising a tube loosely surrounding said valve-stem, the free end of said tube loosely projecting into a recess in the service side of said valve, or an extension therefrom.

12. In a device of the character described, a supply-inlet, a service-outlet, a valve between said inlet and said outlet, a valve-controller, a pressure-chamber at one side thereof, a valve-stem and means of communication between said pressure-chamber and the space on the service side of said valve, comprising a tube loosely surrounding said valve-stem, and flexibly mounted, the free end of said tube loosely projecting into a recess in the service side of said valve or an extension therefrom.

13. In a device of the character described, a supply-inlet, a service-outlet, a valve between said inlet and said outlet, means to utilize the fluid passing through said valve to build up said service pressure and an auxiliary port to modify the building-up capacity of the aforesaid means.

14. In a device of the character described, a supply-inlet, a service-outlet, a valve between said inlet and said outlet, means to utilize the fluid passing through said valve to build up said service pressure and an auxiliary port to modify the building-up capacity of the aforesaid means, and an adjustable valve for said port.

15. In a device of the character described, a valve, a diaphragm-controller therefor, a pressure-chamber on one side of said controller and a reinforcing-plate carried by and extending laterally of said diaphragm and dividing said pressure-chamber into a plurality of compartments having a restricted communication with each other, a fluid-passage, and a communication between said pressure-chamber and the service side of the valve.

16. In a device of the character described, a casing, supply-inlet, a service-outlet, a partition between said inlet and outlet, a valve, a flexible controller, an annulus adjacent but inside the edge of said controller, a pressure-chamber below said controller and extending below the plane of said annulus, and a reinforcing-plate carried by and extending laterally of the diaphragm to divide said chamber into a plurality of compartments connected with each other by a restricted opening.

Signed at New York, N. Y., this 18th day of September, 1899.

ROBERT N. BAYLIS.

Witnesses:
  R. C. MITCHELL,
  ERNEST GREY.